(12) United States Patent
Cummings

(10) Patent No.: US 7,495,997 B1
(45) Date of Patent: Feb. 24, 2009

(54) LIGHT PIPE DISPLAY FOR SONAR

(75) Inventor: Duane E. Cummings, Monticello, MN (US)

(73) Assignee: Nature Vision, Inc., Brainerd, MN (US)

( * ) Notice: Subject to any disclaimer, the term of this patent is extended or adjusted under 35 U.S.C. 154(b) by 13 days.

(21) Appl. No.: 11/753,805

(22) Filed: May 25, 2007

(51) Int. Cl.
*G01S 15/96* (2006.01)

(52) U.S. Cl. .................................... 367/109

(58) Field of Classification Search ................ 367/107, 367/109–111, 114; 116/286; 340/815.45
See application file for complete search history.

(56) References Cited

U.S. PATENT DOCUMENTS

| 2,071,284 A | * | 2/1937 | Hyland | ...................... 116/244 |
| 5,259,333 A | * | 11/1993 | Iino et al. | .................... 116/286 |
| 5,949,346 A | * | 9/1999 | Suzuki et al. | .......... 340/815.45 |
| 7,057,972 B1 | | 6/2006 | Noda et al. | |

* cited by examiner

*Primary Examiner*—Dan Pihulic
(74) *Attorney, Agent, or Firm*—Douglas L. Tschida; James J. Paige

(57) ABSTRACT

A light pipe device for fish sonar that displays information such as depth and density of detected objects. The device includes a motor with a rotary shaft, a shaft position sensor, a light conducting pipe fixed to the rotary shaft opposite the luminous tip of the pipe, a light source, and a front panel. Using this device, when a controller detects an object the controller causes the light source to turn on and off as the luminous tip revolves beneath the front panel. Light is transferred to the tip and front panel to indicate information regarding the object.

11 Claims, 4 Drawing Sheets

LIGHT PIPE DISPLAY FOR SONAR

BACKGROUND OF THE INVENTION

I. Field of the Invention

This invention relates generally to electronic display devices, and more particularly to electronic display devices used with sonar equipment such as a "fish finder."

II. Discussion of the Prior Art

For many years, sonar devices have been used to observe and display the locations and characteristics of objects found underwater. Many of these devices operated using similar components to accomplish this task. Generally in a modern sonar device, a transducer transmits sound waves through the water and detects return echoes of those sound waves. The transducer is connected to a microprocessor via both a transmitter and a receiver. The microprocessor controls the transmission of sound waves via the transmitter and transducer and processes signals received by the microprocessor via the transducer and receiver. More specifically, the microprocessor begins the operation by sending a command to a transmitter to generate a sound wave. The transmitter thereafter sends a sound wave into the water via the transducer. If, as the sound wave travels through the water, it encounters an object the sound wave will bounce off the object creating an echo return. The transducer detects the redirected sound waves (i.e. the echo return) and cooperates with the receiver to forward a signal representative of the echo return to the microprocessor.

The microprocessor is able to calculate the depth of the object detected because the time the sound wave was sent, the time the echo was detected, and the speed sound waves travel through the water are all available to the microprocessor. The microprocessor can also assess the features of the echo returns to determine the size (a.k.a. density) of the object detected. Once the microprocessor has made the required calculations, the microprocessor can use these calculations to control a display.

Displays of various forms have been used in sonar devices. Prior art displays were often mechanically complicated or consumed substantial power making them less than desirable for use when the power source for the sonar and display was a battery. Use of a battery as a power source is common when fishing from a boat without the engine running or when ice fishing. One type of mechanical display involves a motor rotating an arm along which a plurality of light sources are mounted. A series of brushes are used to create electrical connections between the light sources and the microprocessor as the motor turns the arm. Unfortunately, the use of brushes and contacts often proves to be unreliable and such displays frequently do not accurately depict the information received from the sonar. This is particularly true given the often harsh environments in which these components and electronics are often required to operate.

CRTs, liquid crystal and plasma displays are also available, but these generally, consume significant power. They also tend to be too expensive to use when manufacturing a portable, battery operated fish finder.

Therefore, an electronic display device is needed for displaying sonar results that is accurate, simple, inexpensive, power-conserving and which overcomes the problems experienced in past methods and display devices used in sonar applications.

SUMMARY OF THE INVENTION

The present invention relates generally to a display device for a fish sonar having a controller. The device includes a motor with a rotary shaft and a light conducting pipe fixed to and extending from the rotary shaft of the motor for rotation. The light conducting pipe has a light collection end and a light directing member extending from the collection end to a luminous tip. The light conducting pipe revolves around the axis of rotation of the rotary shaft. No other moving parts are required.

The device also includes at least one stationary light source connected to the controller and positioned adjacent the light collection end of the conducting pipe. Since the light sources are stationary, direct electrical connections can be made eliminating the need for brushes. When one of the light sources is illuminated, light from the light source is collected by the light collection end, passed along the light directing member and used to illuminate the luminous tip. The device also includes a shaft position sensor so the controller knows the position of the shaft and thus the position of the luminous pipe which rotates with the shaft. Also found in the device is a front panel having a visual scale which cooperates with the luminous tip of the light pipe to indicate the depth of objects in the water. The front panel also contains a non-opaque portion adjacent the scale through which light from the luminous tip can be viewed. When the controller detects an object in the water and determines its range (i.e. depth), the controller causes a light source to turn on and off when the luminous tip reaches the correct position adjacent the scale as the luminous tip revolves beneath the front panel such that light from the tip cooperates with the scale to indicate the range of the object.

To provide an indication of size or density of the object, the display can include a plurality of light sources of different colors located adjacent the light collection end of the light pipe. The controller can then light one or more of the light sources to generate light at the luminous tip of a particular color, the color providing an indication of the size or density of the object.

The foregoing features, objects and advantages of the invention will become apparent to those skilled in the art from the following detailed description of a preferred embodiment, especially when considered in conjunction with the accompanying drawings.

DESCRIPTION OF THE PREFERRED EMBODIMENT

Figure 1:
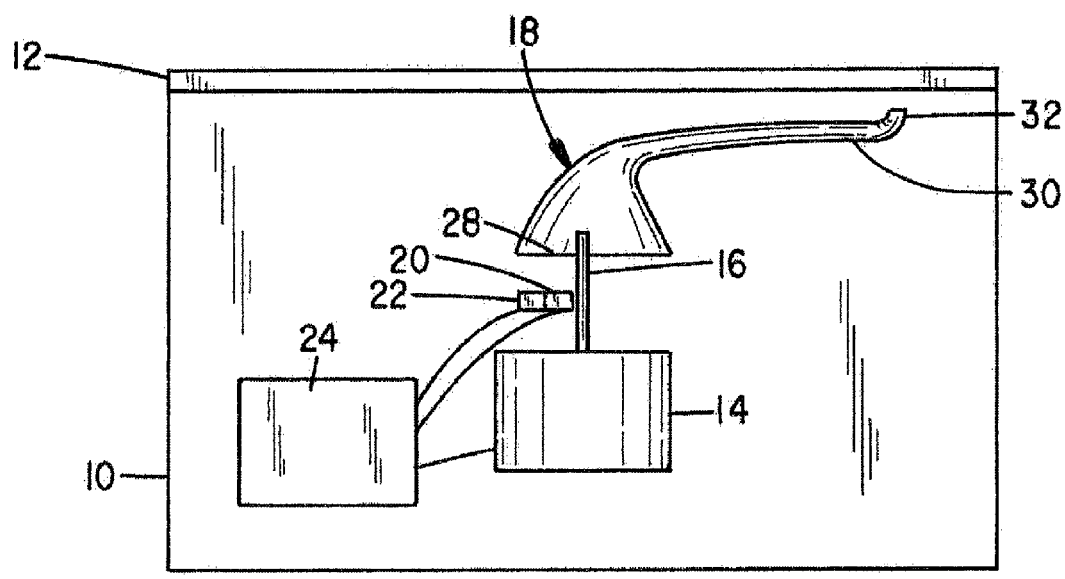
FIG. 1 is a side view of the light pipe display of the present invention.

The electronic display of the present invention can be readily understood from FIGS. 1-4. The display generally includes a housing 10 with a front panel 12, a motor 14 with a rotary shaft 16, a light pipe 18, a shaft position sensor 20 and at least one light source 22. Also seen coupled to this assembly is a controller 24.

The light pipe 18, which may be molded as a single piece or an assembly of several separately formed pieces, includes a light collecting end 28, a light directing member 30, and a luminous tip 32. The motor 14 is typically centrally mounted within the assembly. It operates by rotating the rotary shaft 16 about the shaft's own axis. As shown in FIG. 1, the shaft 16 is mounted to the light collecting end 28 of light pipe 18 so that the light pipe spins with the shaft 16. As such, the luminous tip 32 revolves about the axis of the shaft 16. Coupled to the rotary shaft 16 is a stationary shaft position sensor 20. The shaft position sensor 20 is also coupled to the controller 24. The function of the shaft position sensor is to generate and send to the controller a signal indicating when the shaft has reached a particular position as it rotates. The shaft position sensor 20 could be an encoder, a magnetic pickup or switch, an optical sensor, a Hall effect sensor, or any of a variety of sensors known in the art and used to indicate the position of a rotating member. Alternatively, a stepper motor could be used either alone or in combination with such a sensor and coupled to the controller to indicate shaft position.

Also coupled to the controller is at least one light source 22. Each light source 22 is positioned so that a substantial portion of the light generated by the light source is gathered by the light collecting end 28 of the light pipe 18. Each light source 22 typically comprises an LED. When use of a single light source 22 is desired, the light source 22 can be an RGB LED capable of generating red, green, or blue light or modulated to create light of different colors. Alternatively, three light sources 22 can be provided. For example, there may be three LEDs (one blue, one red, and one yellow) which can be illuminated, either alone or in combination, to produce light at the luminous tip 32 of different colors. In this example, the three colored lights can be combined in different amounts to produce nearly any color desired.

As indicated above, each light source 22 is located adjacent to the light collecting end 28 of the light collecting pipe 18, such that the pipe 18 can collect the light produced by the light source. The light then travels down the light directing member 30 to the luminous tip 32 which will glow in the desired color. This will be discussed later in greater detail. The light source 22 turns on and off in accordance with the commands sent to it by the controller 24 via the microprocessor 26.

As suggested above, the light pipe 18 is attached to the rotary shaft 16 of the motor 14. The light collecting pipe 18 generally has three sections, the light collecting end 28, the light directing member 30, and the luminous tip 32. The end located nearest the rotary shaft 16 is the light collecting end 28. The pipe is attached to the rotary shaft 16 such that the pipe extends away from the central axis of the shaft. As the rotary shaft 16 rotates, the pipe rotates along with the shaft in a sweeping circular motion. The light collecting end 28 collects light given off by each light source 22 and passes this light along light directing member 30 to illuminate the luminous tip 32. The light directing member 30 is generally tubular and contains a material and shape such that a substantial portion of the light cannot escape through or be absorbed by the member's exterior walls. This is so generally all of the light collected at the collecting end 28 exits the pipe 18 through the luminous tip 32. The luminous tip 32 is located at the end of the light directing member 30. The tip revolves around the center of the assembly at a common radius. The luminous tip 32 directs the light it receives from the light collecting pipe through a non-opaque section of the front panel 12.

Figure 2:
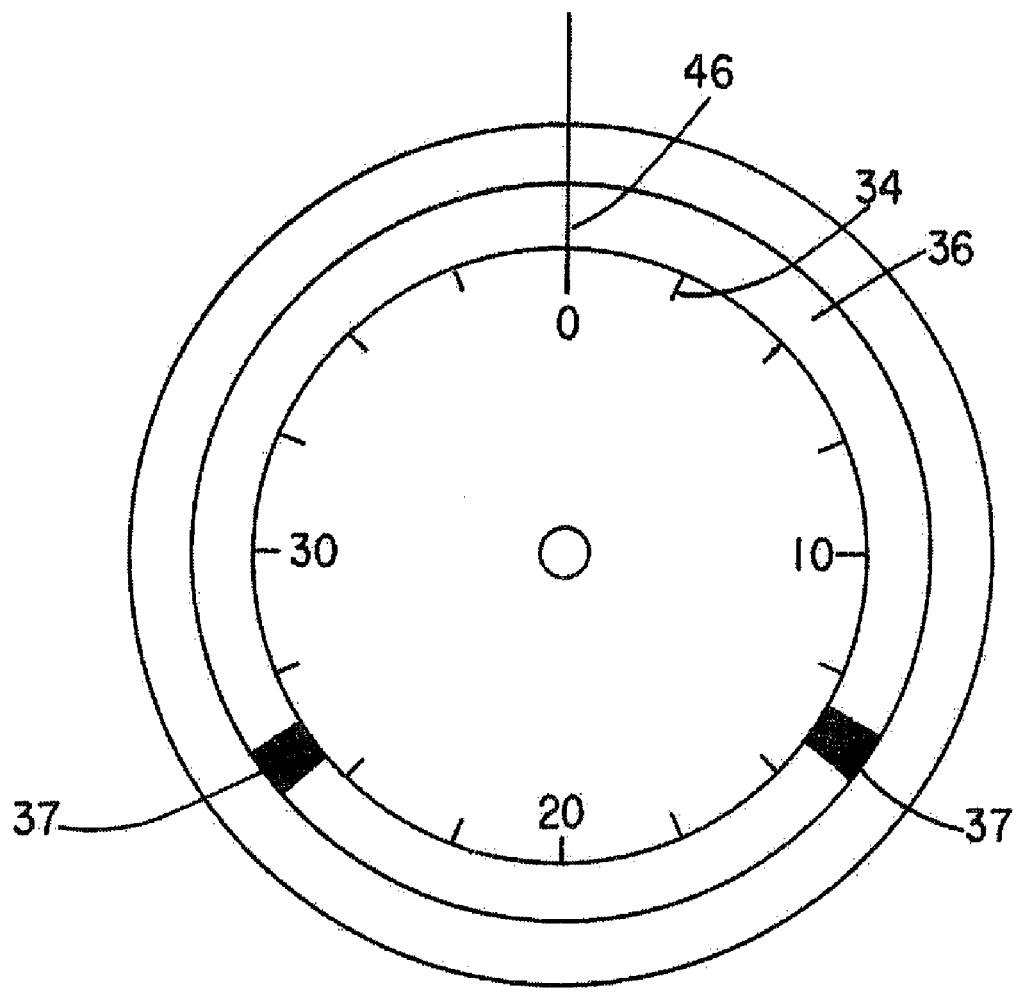
FIG. 2 is a top view of the light pipe display.

The front panel 12 is located just above the path of the revolving luminous tip 32. The panel is generally a relatively thin disc. The features of the panel can be readily viewed in FIG. 2. The panel 12 has a circular scale 34 and at least a ring 36 of non-opaque material above the path of the luminous tip 32 through which the tip's light can be viewed. The scale 34 on the top of the front panel represents various depths of water. As the luminous tip 32 passes by the mark corresponding to the depth at which a sonar detected an object, one or more of the light sources 22 are illuminated briefly to light the luminous tip 32. Because the arm of the collecting pipe 18 is rotating very quickly, the brief illuminations of the luminous tip 32 appear to be a constant light at one or more signaled depth locations. FIG. 2 discloses an example of the appearance of front panel 12 displaying sonar detections 37 at multiple depths. The one or more light sources 22 are lighted each time the luminous tip passes beneath the locations 37 to indicate objects were detected at that depth. The panel is also constructed such that the scale of depths indicated on its face may be adjusted to most appropriately reflect the depth of water that is of interest. This feature allows the display to be useful in a broad range of water depths.

Further, light generated on the front panel 12 by the luminous tip 32 may be of a variety of colors to correspond to other information, such as density or size of objects. As shown in the drawings, one of the locations 37 is lighted green and the other is lighted red to indicate the size of the object detected at the two depths indicated. When the controller detects density or size information it causes the light source(s) 22 to give off light of a color that corresponds to a particular density or size. This light is sent through the light collecting pipe 18 to the luminous tip 32 and is displayed on the front panel 12. A viewer is then able to determine the density or size of a detected object based on the color of light being viewed. Having this type of information is useful to operators who might be interested in identifying the fish, creature or object being detected by the sonar.

Figure 3:
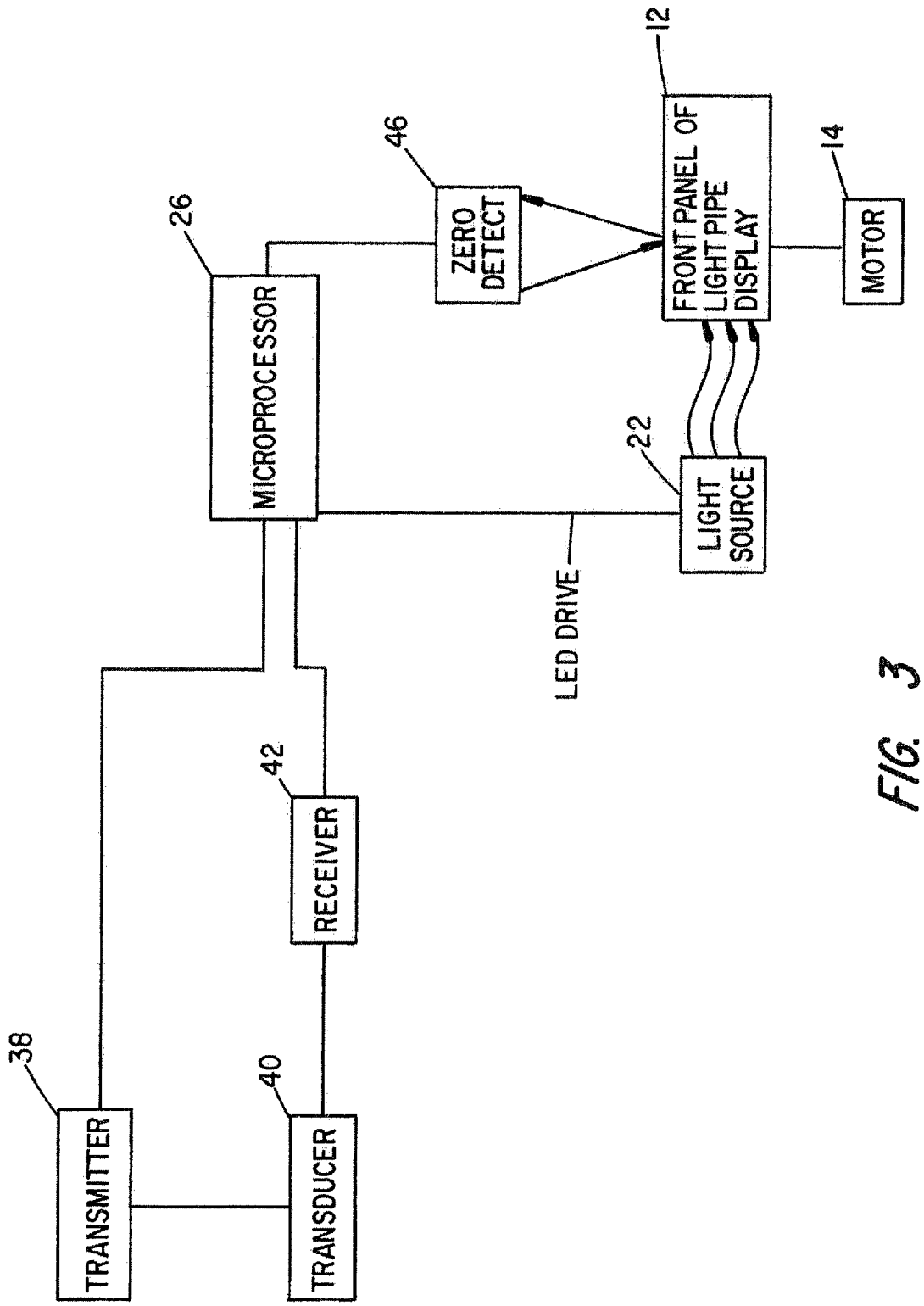
FIG. 3 is a chart setting forth a control block diagram of the light pipe display.

FIG. 3 discloses a control block diagram of the operation of the sonar light pipe display. Generally, the microprocessor 26 sends out a command to a transmitter 38. The transmitter 38 next causes a sound wave to emanate from transducer 40 located in a body of water. When the sound wave reaches an object in the water, the sound wave bounces off objects and returns as an echo to the transducer 40. The transducer 40 collects return echoes and sends them to a receiver 42, which in turn, formulates signals representative of the return echoes and forwards such signals to the microprocessor 26. The microprocessor processes these signals to calculate the range (depth) of each object detected as well as its size. The microprocessor 26 also processes signals received for the shaft position sensor 20 to generate signals which control illumination of the light source(s) 22 so they turn on and off when the luminous tip 32 is at the correct location as it revolves about shaft 16. Light from the illuminated light source(s) 22 is delivered to the luminous tip 32 of the display as described above. Zero detect 46 provides microprocessor 26 with a signal every time light directing member 30 passes through the zero reference numeral shown in FIG. 2.

Figure 4:
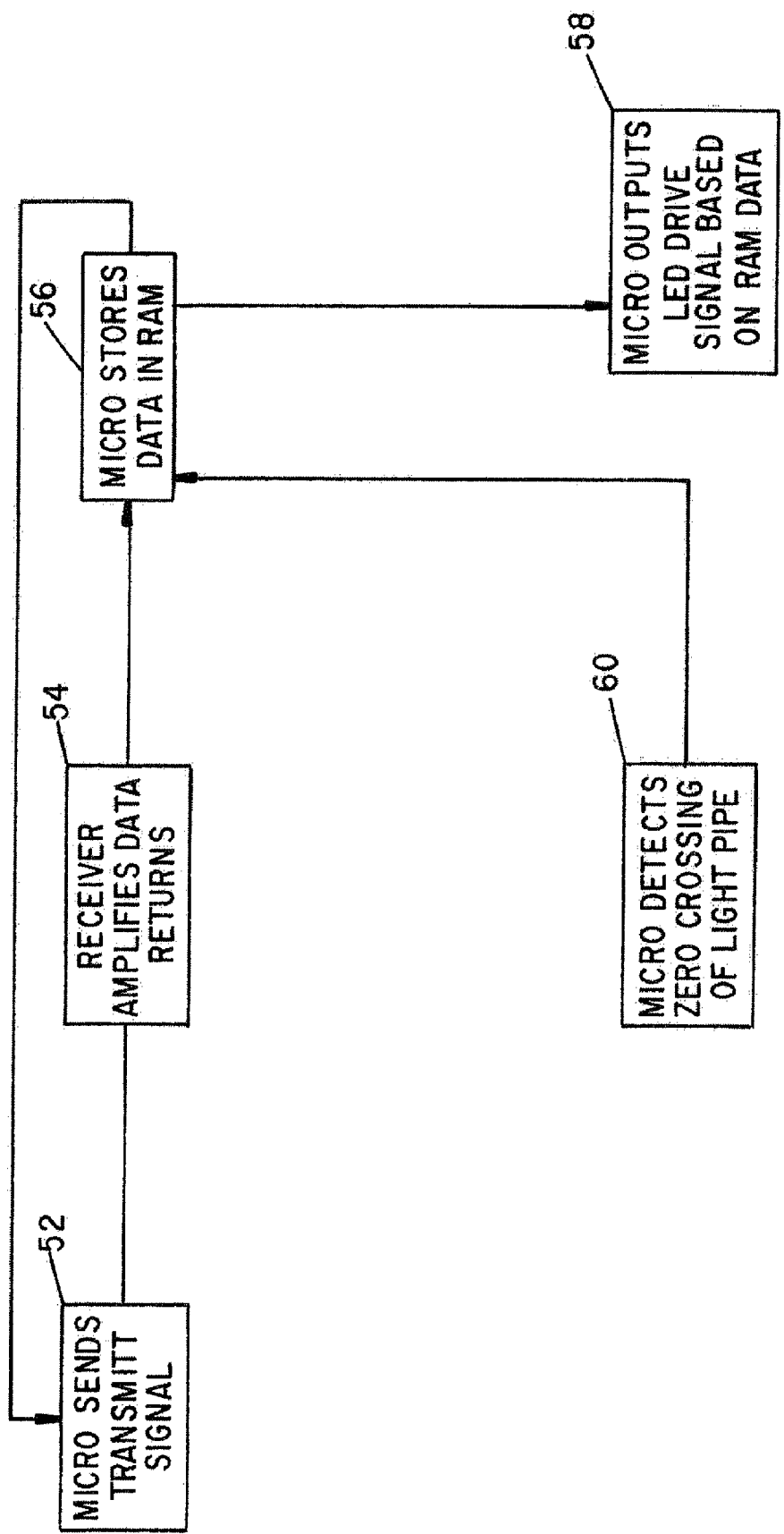
FIG. 4 is a flow chart of the light pipe display.

FIG. 4 is a simple flow chart related to the operation of microprocessor 26. First, at step 52 the microprocessor sends out a transmit signal. Next, at step 54 the receiver amplifies the data returns received. Next, at step 56 the microprocessor stores data in the memory. Also stored in memory as indicated by block 60, is a signal generated by shaft position sensor 20 each time the shaft 16 reaches a zero point. The microprocessor uses the data stored in memory to determine the depth and size of objects in the water and to indicate depth. The microprocessor outputs light source drive signals at step 58 to light one or more of the light sources to provide light at the luminous tip 32 at the correct time as the luminous tip passes the correct point on the scale. The light generated is also the correct color to indicate size.

Those skilled in the art will appreciate that the light pipe display device of the present invention may be manufactured in a variety of shapes and sizes to accommodate various sizes and types of sonar displays. The display components can be composed of any number of suitable materials. Also, the design of the present invention should not be construed to limit its application to sonar displays. Display of other location and/or density defining information is also contemplated by this invention though use of a rotating light pipe in a similar manner.

The invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

The invention claimed is:

1. A display for fish sonar, comprising:
   (a) a motor, said motor including a rotary shaft;
   (b) a shaft position indicator operationally coupled to a controller of the fish sonar;
   (c) a light conducting pipe fixed to and extending from the rotary shaft of said motor for rotation therewith, said light conducting pipe having a light collection end and a light directing member extending from said collection end to a luminous tip that revolves around the axis of rotation of the rotary shaft;
   (d) a light source operationally connected to the controller and positioned adjacent the light collection end of said conducting pipe such that when said light source is illuminated, light from said light source is collected by the light collection end, passed along the light directing member and used to illuminate the luminous tip; and
   (e) a front panel having a scale and a non-opaque portion through which light from the luminous tip can be viewed, wherein when the controller detects an object in the water and determines its range, the controller causes said light source to turn on and off as the luminous tip revolves beneath the front panel such that light from the tip cooperates with the scale to indicate the range of the object.

2. The light pipe display as in claim 1 wherein the light shown on the front panel indicates the depth of the objects including fish and lake features.

3. The light pipe display as in claim 2 wherein the light shown on the front panel reflects the density of the objects including fish and lake features.

4. The light pipe display as in claim 3 wherein the front panel may be calibrated to show various ranges of water depth.

5. The light pipe display as in claim 1 wherein the light source includes a plurality of different colored LEDs.

6. The light pipe display as in claim 1 wherein the light source includes one LED that can produce a plurality of colors.

7. The light pipe display as in claim 1 wherein said front panel is calibrated based upon a zero detect signal that corresponds to a location passed by said rotary light conducting pipe.

8. The light pipe display as in claim 1 wherein said shaft position indicator comprises a sensor.

9. A display for fish sonar, comprising:
   (a) a stepper motor, said stepper motor including a rotary shaft and coupled to a controller so the controller knows the position of the shaft;
   (b) a light conducting pipe fixed to and extending from the rotary shaft of said motor for rotation therewith, said light conducting pipe having a light collection end and a light directing member extending from said collection end to a luminous tip that revolves around the axis of rotation of the rotary shaft;
   (c) a light source operationally connected to the controller and positioned adjacent the light collection end of said conducting pipe such that when said light source is illuminated, light from said light source is collected by the light collection end, passed along the light directing member and used to illuminate the luminous tip; and
   (d) a front panel having a scale and a non-opaque portion through which light from the luminous tip can be viewed, wherein when the controller detects an object in the water and determines its range, the controller causes said light source to turn on and off as the luminous tip revolves beneath the front panel such that light from the tip cooperates with the scale to indicate the range of the object.

10. A light pipe display for fish sonar comprising:
    (a) a motor, said motor including a rotary shaft;
    (b) a rotary light conducting pipe fixed to the rotary shaft of said motor, said light conducting pipe having a light collection end, a light directing shaft, and a luminous tip;
    (c) a light source including at least one LED positioned adjacent the light collection end of said conducting pipe, said light source controlled by a microprocessor sending out signals based upon sonar information, said light collection pipe positioned such that when said light source is illuminated, light from said light source is collected by the light collection end, passed along the light directing shaft and displayed on the luminous tip;
    (d) a panel at least partially composed of nonopaque material under which the luminous tip of the conducting pipe moves in a circular path based on the rotation of the rotary shaft, the tip lighting the circular path at locations corresponding to the sonar information.

11. The method for displaying sonar detections comprising the steps of:
    (a) outputting a signal of light from a light source controlled by a microprocessor said light source made up of one or more LEDs, said signal of light responsible for relaying information from sonar signals received from a body of water;
    (b) conducting the signal of light using one end of a rotating light conducting pipe;
    (c) allowing the signal of light to pass down a light directing shaft of the rotating light conducting pipe and out to a illuminated tip of the light conducting pipe;
    (d) displaying the illuminated tip of the light conducting pipe on a panel containing calibrations; and
    (e) interpreting the display information on the panel created by the illuminated tip in terms of depth and density of fish and objects in a body of water.

\* \* \* \* \*